United States Patent [19]

Policastro

[11] Patent Number: 4,599,393

[45] Date of Patent: Jul. 8, 1986

[54] METHOD FOR POLYMERIZING LACTAMS AND PRODUCTS OBTAINED THEREFROM

[75] Inventor: Peter P. Policastro, Schenectady, N.Y.

[73] Assignee: General Electric Company, Schenectady, N.Y.

[21] Appl. No.: 728,136

[22] Filed: Apr. 29, 1985

[51] Int. Cl.$^4$ ............................................. C08G 77/06
[52] U.S. Cl. ........................................ 528/12; 528/14; 528/21; 528/23; 528/28; 528/26; 525/431
[58] Field of Search ............... 528/28, 26, 12, 14, 528/21, 23; 525/431

[56] References Cited

U.S. PATENT DOCUMENTS 3,017,391 1/1962 Mottus et al. .
3,366,608 1/1968 Lincoln et al. .
4,400,490 8/1983 Yang et al. .

OTHER PUBLICATIONS

British Patent Specification 900,152.

Primary Examiner—Melvyn I. Marquis
Attorney, Agent, or Firm—William A. Teoli; James C. Davis, Jr.; James Magee, Jr.

[57] ABSTRACT

A method is provided for making polyamides and silicone polyamide block and graft polymers by heating a mixture of a lactam in the presence of a silicon containing material, such as a silyl lactam, and a mixture of fluoride ion catalyst and a promoter such as an organic isocyanate. The resulting polyamides or silicon polyamide block or graft polymers can be utilized to make silicone elastomeric adhesives or injection moldable polyamides.

10 Claims, No Drawings

METHOD FOR POLYMERIZING LACTAMS AND PRODUCTS OBTAINED THEREFROM

CROSS REFERENCE TO RELATED APPLICATIONS

Reference is made to copending applications Ser. No. 706,374, L filed Feb. 27, 1985 of Policastro et al., for Silicon-Lactam Blends and Products Obtained Therefrom, and Ser. No. 645,638, filed Aug. 30, 1984, of Policastro et al., for Silylpolyamides and Method for Their Preparation, where both applications are assigned to the same assignee as the present invention and incorporated herein by reference.

BACKGROUND OF THE INVENTION

Prior to the present invention, nylon compositions were prepared by anionic polymerization of a lactam in the presence of an anionic polymerization catalyst and a promoter such as an isocyanate or N-acyllactam compound. A typical nylon polymerization procedure is shown by Mottus et al., U.S. Pat. No. 3,017,391. Although the nylon compositions of Mottus et al. provide useful materials, the polyamide compositions require the use of an anionic polymerization catalyst, such as sodium hydride which must be protected from atmospheric moisture. In certain instances, moisture-sensitive catalysts are not required for lactam polymerization. However, in such cases the reaction is often slower and higher temperatures are needed for a satisfactory polymerization rate.

In copending application Ser. No. 706,374, anionic polymerization of lactams was achieved by using certain lactam polymerization promoters having silicon attached to the lactam nitrogen by silicon-nitrogen linkages. Base catalyzed crosslinkable blends of lactam and silicon substituted lactam, convertible to high molecular weight polyamide, were obtained upon heating. In addition, reinforced crosslinked polyamide was obtained by incorporating into such silicon-lactam blends, high performance aromatic thermoplastic polymers, or inert materials, such as glass fiber or reinforcing silica.

The present invention is based on my discovery of a substantially moisture insensitive catalyst for lactam polymerization. The catalyst is a fluoride ion which is used in combination with a promoter, such as an isocyanate, and a certain silicon containing material, for example, an N-silylated lactam or alkoxysilane. Advantageously, the catalyst, in addition to being substantially moisture insensitive, is capable of effecting lactam polymerization at temperatures as low as 25° C.

STATEMENT OF THE INVENTION

There is provided by the present invention, a method for polymerizing lactam, which comprises, heating in the presence of an effective amount of a fluoride ion containing catalyst, a lactam polymerization promoter, and a silicon containing lactam material selected from a member of the class consisting of (A) 0.01 to 100 mole percent of silicon-lactam and 99.99 to 0 mole percent of lactam, and (B) a blend comprising a mixture of lactam, and 0.01 to 1 mole, per mole of lactam of a silicon containing material selected from the class consisting of
  (i) organosilazanes and organopolysilanes,
  (ii) silanes and organopolysiloxanes having at least one —OR radical attached to silicon and
  (iii) silylating agents having at least one labile monovalent group attached to silicon by silicon-nitrogen linkages and selected from silane and organopolysiloxane, where R is a $C_{(1-8)}$ aliphatic hydrocarbon radical or substituted $C_{(1-8)}$ aliphatic hydrocarbon radical and the silicon-lactam of (A) has at least one silicon atom attached to a lactam ring by a silicon-nitrogen linkage selected from the class consisting of silanes, organosiloxanes, cycloorganosiloxanes, organopolysilanes, polysilalkylenes, polysilarylenes, organosilazanes and cycloorganosilazanes.

Lactam which can be utilized in the practice of the present invention is included by the formula

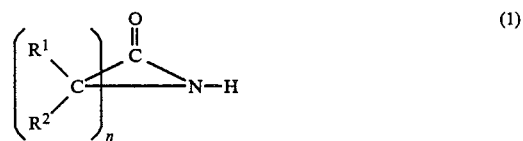

where $R^1$ and $R^2$ are members selected from the class consisting of hydrogen, $C_{(1-8)}$ alkyl, substituted $C_{(1-8)}$ alkyl, $C_{(6-13)}$ aryl, substituted $C_{(6-13)}$ aryl and mixtures thereof, and n is an integer equal to 1–13 inclusive.

Some of the lactams included by formula (1) are, for example,

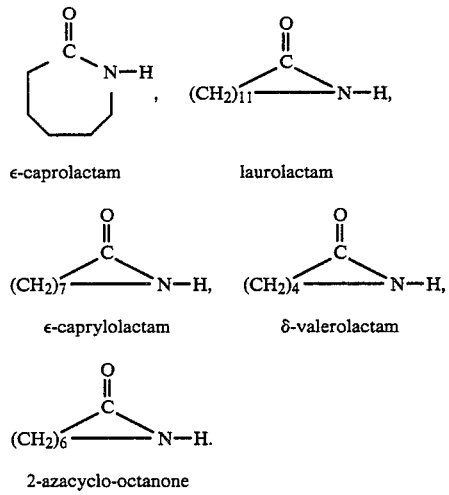

ε-caprolactam    laurolactam

ε-caprylolactam    δ-valerolactam 2-azacyclo-octanone

Silicon-lactam of (A) as shown in the Statement of the Invention which can be used are, for example, silanes such as

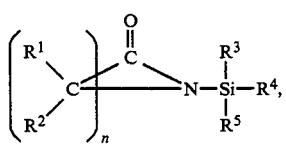

-continued

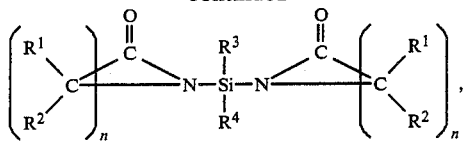

where $R^1$, $R^2$ and n are as previously defined, and $R^3$, $R^4$ and $R^5$ are the same or different radicals selected from $R^1$, $R^2$ and $C_{(1-8)}$ alkoxy; the silicon-lactam of (A) also includes organosiloxanes and organosilazanes such as

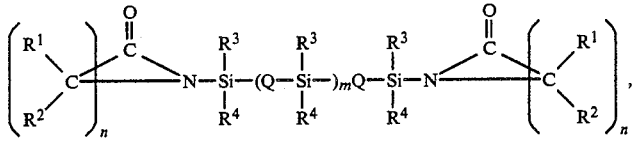

and polysilanes such as,

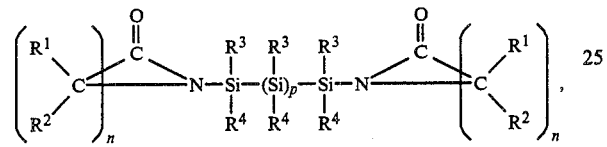

where $R^1$, $R^2$, $R^3$, $R^4$ and n are as previously defined, Q is a divalent group selected from oxygen or a nitrogen radical, m has a value of 0 to 1000 inclusive and p has a value of 0 to 50 inclusive.

Silanes having at least one —OR radical attached to silicon as previously defined for the silicon containing material of (B) in the Statement of the Invention, include for example,
t-butyloxytrimethylsilane;
methoxytrimethylsilane;
trimethoxymethylsilane;
dimethoxydimethylsilane;
vinyloxytrimethylsilane;
allyloxytrimethylsilane;
t-butoxytriethylsilane;
ethoxydimethylphenylsilane;
methoxydiphenylmethylsilane;
methoxydimethylvinylsilane;
t-butoxy-t-butyldimethylsilane;
methoxy-t-butyldimethylsilane.

In addition to the above silanes, organopolysiloxanes can be used having at least one —OR radical attached to silicon, and preferably polymers consisting essentially of chemically combined diorganosiloxy units, where the organo radicals are preferably selected from methyl, phenyl, vinyl, trifluoropropyl and mixtures thereof, and chain-stopped with —OR containing siloxy units.

Some silylating agents of (B) as shown in the Statement of the Invention, preferably are silanes having a boiling point of at least 25° C. and are included within the formula $(R^5)_a SiX_{4-a}$, where X is preferably carbamato, amido, amino, ureido, imido, $R^5$ is selected from $C_{(1-13)}$ monovalent hydrocarbon radicals and substituted $C_{(1-13)}$ monovalent hydrocarbon radicals, and a has a value of 0 to 3 inclusive. Some of these silanes are, for example,
N,O-bis(trimethylsilyl)carbamate;
N,O-bis(trimethylsilyl)trifluoroacetamide;
N,N-bis(trimethylsilyl)urea;
N-methyl-N-dimethylsilyltrifluoroacetamide.

Some of the polydiorganosiloxanes which can be used as silylating agents are included within the formula,

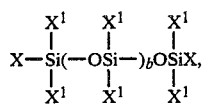

where $X^1$ is selected from $R^5$ and X, and b has a value of 0 to 1000 inclusive.

Radicals included by R are, for example $C_{(1-8)}$ alkyl, such as methyl, ethyl, propyl, butyl, t-butyl, pentyl, hexyl, heptyl, octyl, alkenyl, such as vinyl, allyl; alkynyl, such as ethynyl, 1-propynyl, 2-propynyl, trifluoropropyl. Radicals included by $R^1$ and $R^2$ are, for example, all the R radicals $C_{(6-13)}$ aryl radicals such as phenyl, xylyl, tolyl, napthyl; haloaryl such as chlorophenyl, bromotolyl. In the above formulas where R, $R^1$ and $R^2$ represent more than one radical, these radicals can be the same or different.

Some of the organosilazanes of (B) of the Statement of the Invention which can be used as lactam silylating agents are, for example, hexamethyldisilazane, 1,3-divinyl-1,1,3,3-tetramethyldisilazane, and octamethylcyclotetrasilazane.

Source of fluoride ion which can be utilized in combination with the activator in the practice of the method of the present invention to make the fluoride ion containing catalyst include, for example, lithium, sodium, potassium or cesium fluoride, tetrabutylammonium fluoride, tetraphenylphosphonium fluoride, tetramethylammonium fluoride, tetraphenylammonium fluoride, triphenylsulfonium fluoride, magnesium fluoride, calcium fluoride and bencyltrimethylammonium fluoride.

Lactam-polymerization promoters which can be used in the practice of the method of the present invention in combination with the fluoride ion containing catalyst are, for example, organic anhydrides, esters, imides, acid chlorides, sulfonyl chlorides and anhydrides, phosphonyl chlorides, isocyanates such as phthalic anhydride, phenyl acetate, N-phenylphthalimide, phenylisocyanate, acetyl chloride, methanesulfonyl, chloride, methanesulfonic anhydride, phenylphosphonyl chloride, epsilon caprolactone, halogenated aromatic ring compound with activated halogen, thiolactones, polythiolactones, allophanoyl halides, N,N'-dialkylazetidinediones, substituted biurets, poly(N-phenyl isocyanate), substituted diacyl methanes, various amides based on aromatic amines, various P-containing amides based on aromatic amines, halogenated acetanilide derivatives, aromatic substituted alkyl diketone, substituted triazine, trifluoroacetic anhydride, hexamethylene diisocyanate, N-alkylated lactam (e.g., 2-10 wt% N-methyl-ε-caprolactam).

There can be used from 1.1 to 100 moles of fluoride ion, and preferably from 1.1 to 10 moles of fluoride ion, per mole of lactam polymerization promoter in the polymerization mixture. An "effective amount of fluoride ion containing catalyst" means sufficient fluoride containing catalyst is utilized in the lactam polymerization mixture to provide at least about from $2 \times 10^{-5}$ percent by weight to about 4% by weight of fluoride ion based on the weight of lactam.

The elastomeric adhesive products made in accordance with the practice of the present invention, can be used in combination with finely divided inert fillers including titanium dioxide, zirconium, silicate, silica aerogel, iron oxide, diatomaceous earth, fumed silica, carbon black, precipitated silica, glass fibers, polyvinylchloride, ground quartz and calcium carbonate. The amounts of filler used can obviously be varied within wide limits in accordance with the intended use. There can be used up to 100 parts of filler, per 100 parts of the heat curable silicon containing lactam blends.

The lactams polymerized in accordance with the practice of the method of the present invention can be made by combining the various reactants at ambient temperatures in the presence of an organic solvent to effect the polymerization of the lactam. Suitable organic solvents which can be utilized are, for example, tetrahydrofuran and other inert organic solvents such as toluene, chlorobenzene and dimethylformamide. The order of addition of the various reactants is not critical, and after a few minutes high molecular weight polyamide readily precipitates from the mixture. A suitable degree of agitation, such as stirring, will facilitate the polymerization of the lactam. It has been found that polymerization is complete within two to three minutes. The resulting polyamide can be further washed with an organic solvent such as methanol if desired. The polyamide can then be pelleted and converted to molded parts by conventional injection molding procedures.

An alternative procedure for effecting the polymerization of the polyamide is to add the various ingredients such as the silyl lactam, the fluoride ion catalyst and the promoter to the lactam in the molten state at temperatures in the range of from 70° C. to 350° C. and preferably from about 100°-160° C. Although the order of addition of the various ingredients is not critical, rapid polymerization of the lactam will result as soon as all of the ingredients of the reaction have been added.

It has been found that the use of the polyamide compositions of the present invention as elastomeric adhesives can be facilitated by combining the various ingredients of the reaction mixture while in a preheated state. For example, a molten mixture of lactam and the silyl lactam and promoter can be combined with a molten mixture of lactam and the fluoride ion catalyst to produce a polymerization mixture which can be applied onto a preheated substrate. A second heated substrate can then be placed on top of the heated mixture to create a lap shear joint. Suitable substrates are, for example, metallic substrates such as steel sheet, ceramic, glass, etc. A bonded composite can then be obtained upon allowing the resulting structure to cool to ambient temperature.

In order that those skilled in the art will be better able to practice the invention, the following examples are given by way of illustration and not by way of limitation. All parts are by weight.

EXAMPLE 1

A mixture was refluxed consisting of 2 gram of N-trimethylsilyl-ε-caprolactam and 1 ml. of a one molar solution in tetrahydrofuran of tetrabutylammonium fluoride. There was then added 10 microliters of phenylisocyanate to the mixture. After a few minutes, a product precipitated from solution. Based on method of preparation, the product was a polypentamethyleneamide having chemically combined trimethylsilylamine groups. The product was isolated by filtration and washed with methanol and provided a 55% yield of Nylon-6: $T_m = 210$; IV(meta-cresol)=0.93 dL/g; $M_n = 14,600$; $M_w = 37,600$—GPC (meta-cresol)—relative to polystyrene. The product was useful as a molding compound.

EXAMPLE 2

There was melted 10 grams (0.09 mole) of ε-caprolactam at 125° C. There was added to the melt, 0.5 grams (0.002 mole) of N-trimethylsilylcaprolactam and 0.3 grams (0.002 mole) of finely powdered cesium fluoride. Upon addition of 0.07 grams (0.0005 mole) of phthalic anhydride a rapid reaction occurred. There was obtained a solid polymeric mass. Based on method of preparation, the product was a Nylon-6 polyamide which had an intrinsic viscosity of 0.9 dL/g in m-cresol. The product is useful as a molding compound. The reaction is also allowed to occur in Teflon ® resin mold. There is obtained a molded part.

EXAMPLE 3

There were added 0.5 grams (0.002 mole) of N-trimethylsilylcaprolactam and 0.07 grams (0.0006 mole) of phenylisocyanate to a 5 gram (0.045 mole) of an ε-caprolactam melt at 125° C,. A separate mixture was prepared by adding 0.3 gram (0.002 mole) of finely divided powdered cesium fluoride suspended in 5.0 grams (0.04 mole) of ε-caprolactam at 125° C. The molten mixtures were mixed and immediately poured onto a steel plate and heated to 140° C. A second heated steel plate was placed on top of the applied mixture to create a lap shear joint. After several minutes at 140° C., the lap shear joint was cooled to room temperature to produce a tough composite of steel and polyamide.

EXAMPLE 4

There was melted 10 grams (0.09 mole) of ε-caprolactam at 125° C. There was added to the melt, 0.3 grams (0.002 mole) N-(trimethylsilyl)acetamide and 0.1 g (0.002 mole) finely powdered potassium fluoride. Upon addition of 0.07 grams (0.0005 mol) of phthalic anhydride, a rapid reaction occurred and a solid mass of Nylon-6 was obtained. The product was useful as a molding compound.

Although the above examples are directed to only a few of the very many variables which can be employed in the practice of the method of the present invention, it should be understood that the present invention involves the use of a much broader variety of lactam, silicon-lactams, fluoride ion catalyst and promoters as shown in the description preceding these examples.

What I claim as new and desire to secure by Letters Patent of the United States is:

1. A method for polymerizing lactam, which comprises, heating in the presence of an effective amount of a fluoride ion containing catalyst, a lactam polymerization promoter, and a silicon containing lactam material selected from a member of the class consisting of
   (A) 0.01 to 100 mole percent of silicon-lactam and 99.99 to 0 mole percent of lactam, and
   (B) a blend comprising a mixture of lactam, and 0.01 to 1 mole, per mole of lactam of a silicon containing material selected from the class consisting of
      (i) silanes or organopolysiloxanes having at least one —OR radical attached to silicon, and
      (ii) silylating agents selected from the class consisting of silanes having a boiling point of at least 25° C. and included within the formula

and polydiorganosiloxanes included withiin the formula

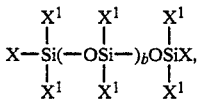

where R is a $C_{(1-8)}$ aliphatic hydrocarbon radical or substituted $C_{(1-8)}$ aliphatic hydrocarbon radical, the silicon lactam of (A) has at least 1 silicon atom attached to a lactam ring by a silicon-nitrogen linkage and such silicon lactam is a member selected from the class consisting of silanes, organosiloxanes, cycloorganosiloxanes, organopolysilanes, polysilalkylenes, polysilarylenes, organosilazanes and cycloorganosilazanes, X is a member selected from the class consisting of carbamato, amido, amino, ureido, and imido $R^5$ is a member selected from the class consisting of $C_{(1-13)}$ monovalent hydrocarbon radicals, and substituted $C_{(1-13)}$ monovalent hydrocarbon radicals, $X^1$ is a member selected from the class consisting of $R^5$ and X, a has a value of 0-3 inclusive, and b has a value of 0-1000 inclusive.

2. A method in accordance with claim 1, where the silicon containing lactam material is polymerized in the presence of 100 parts of filler, per 100 parts of silicon containing lactam material.

3. A method in accordance with claim 1, where the silicone material of (B) is a t-butoxysilane silane.

4. A method in accordance with claim 1, where the lactam is $\epsilon$-caprolactam.

5. A method in accordance with claim 1, where the lactam is in the form of a mixture of lactams.

6. A method in accordance with claim 1, where the silicon-lactam of (A) is N-trimethylsilyl-$\epsilon$-caprolactam.

7. A method in accordance with claim 1, where tetrabutylammonium fluoride is used as the fluoride ion containing catalyst and phenylisocyanate is used as the lactam polymerization promoter.

8. A method in accordance with claim 1, where the fluoride ion catalyst is cesium fluoride.

9. A method in accordance with claim 1, where the fluoride ion containing catalyst is a mixture of cesium fluoride and phthalic anhydride.

10. A cresol soluble polyamide made in accordance with the method of claim 1.

* * * * *